US006238775B1

(12) United States Patent
Teramoto et al.

(10) Patent No.: US 6,238,775 B1
(45) Date of Patent: May 29, 2001

(54) TRANSFER MATERIAL-CARRYING MEMBER

(75) Inventors: Yoshikichi Teramoto; Hideki Kitamura; Satoru Matsunaga, all of Niihara-gun (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/261,161

(22) Filed: Mar. 3, 1999

(30) Foreign Application Priority Data

Mar. 13, 1998 (JP) ........................................ 10-082558

(51) Int. Cl.[7] ........................ B41M 5/035; C08L 77/00

(52) U.S. Cl. ........................ 428/195; 428/914; 525/420; 525/425

(58) Field of Search ........................ 525/425, 420; 428/195, 914

(56) References Cited

U.S. PATENT DOCUMENTS 4,837,115 * 6/1989 Igarashi et al. .................... 428/36.92
5,172,173 12/1992 Goto, et al. .................... 355/275
5,302,574 * 4/1994 Lawrence et al. .................... 503/227
5,340,884 * 8/1994 Mills et al. .................... 125/420
5,342,819 * 8/1994 Takiguchi et al. .................... 503/227
5,650,469 * 7/1997 Long et al. .................... 525/425

FOREIGN PATENT DOCUMENTS 0 767 414 A1 4/1997 (EP) .
06149083 5/1994 (JP) .
7-311472 11/1995 (JP) .

* cited by examiner

*Primary Examiner*—Ana Woodward
(74) *Attorney, Agent, or Firm*—McDermott, Will & Emery

(57) ABSTRACT

The invention relates to a transfer material-carrying member formed from a resin composition comprising at least two resins selected from the group consisting of (A) a polyester resin containing a predominant repeating unit composed of ethylene terephthalate and having a reduced viscosity of at least 0.9 dl/g, (B) a polyamide resin, and (C) a polycarbonate resin, wherein the compositional proportions by mass % of the respective resins are included within a range of a pentagon having points (98, 2, 0), (85, 15, 0), (65, 15, 20), (72, 0, 28) and (90, 0, 10) as vertexes when represented by a triangular coordinate indicated in the above order (A, B, C). The member has excellent mechanical fatigue endurance, tensile elongation at break, mechanical endurance, stiffness and the like and a high specific dielectric constant and makes it possible to lower voltage required upon repeated charging and discharging.

11 Claims, 1 Drawing Sheet

TRANSFER MATERIAL-CARRYING MEMBER

FIELD OF THE INVENTION

The present invention relates to transfer material-carrying members formed from a resin composition, and more particularly to transfer material-carrying members used in image forming apparatus such as copying machines according to an electrophotographic system, printers and facsimiles.

BACKGROUND OF THE INVENTION

In image forming apparatus (electrophotographic copying machine, electrostatic recording apparatus, etc.) such as copying machines according to an electrophotographic system, printers and facsimiles, images are formed through steps such as charging, exposure, development, transfer and fixing. In such an image forming apparatus, a toner image formed on a photosensitive drum through the steps of charging, exposure and development is transferred to a transfer material such as transfer paper or OHP film and then fixed to the transfer material by a means such as heating. In the transfer step of the image forming apparatus, there is used a transfer material-carrying member having the functions of carrying a transfer material, conveying the transfer material to a transfer position and separating the transfer material after transferring a toner image to the transfer material to deliver it to a fixing step.

A dielectric or conductive film has heretofore been used as such a transfer material-carrying member. In many cases, the transfer material-carrying member is formed in the form of a drum or endless belt. It is very important that a material used for the transfer material-carrying member should be a material capable of controlling the electrical characteristics of the transfer material-carrying member within preferred ranges. At the same time, it is also necessary for such a material to have excellent mechanical characteristics, because the transfer material-carrying member is required to play a role as a mechanical structure.

A resin material comprising a polycarbonate resin as a main component has been proposed as a resin material for transfer material-carrying members (Japanese Patent Application Laid-Open No. 311472/1995). In this technical field, besides this material, polyester resins such as polyethylene terephthalate and polybutylene terephthalate, fluorocarbon resins such as polyvinylidene fluoride, and the like are used as resin materials. However, these resin materials have both merits and demerits and do not fully satisfy high electrical characteristics and mechanical physical properties required of the transfer material-carrying members.

For example, a transfer material-carrying member formed from a polycarbonate resin exhibits far excellent fatigue endurance, but is not sufficient in electrical characteristics such as dielectric constant and also insufficient in tensile elongation at break. More specifically, the polycarbonate resin is excellent in stiffness or rigidity, but, on the other hand, it has high brittleness. Therefore, the transfer material-carrying member formed from the polycarbonate resin tends to cause brittle fracture when it passes the mechanical endurance limit. This suggests the possibility that the polycarbonate resin may be lacking in the reliability as a mechanical part. In order to provide a transfer material-carrying member as a high-performance member, it is desirable that the member should have good stiffness and cause ductile fracture. However, the resin material comprising the polycarbonate resin as a main component is not sufficient in these characteristics.

In addition, the polycarbonate resin has a low dielectric constant. Polyester resins also have not a very high dielectric constant. Charging and discharging are repeated on a transfer material-carrying member upon use. If the dielectric constant of the transfer material-carrying member is low, it is necessary to make applied voltage higher. More specifically, a charge level upon charging operation is represented by the equation (1):

$$Q=CV \quad (1)$$

wherein Q is charge, C is capacitance, and V is applied voltage. If C ($\alpha\ \epsilon$: dielectric constant) is small, it is necessary to make V higher in order to obtain a fixed Q. In order to make V higher, it is necessary to make an electric power unit larger. Therefore, the apparatus cost is increased as a whole. When high voltage is applied, discharge toward peripheral metal members and the like tends to occur, and so the necessity of taking insulation measure arises.

OBJECTS AND SUMMARY OF THE INVENTION

It is an object of the present invention to provide a transfer material-carrying member which has excellent mechanical fatigue endurance, tensile elongation at break, mechanical endurance, stiffness and the like and a high specific dielectric constant and makes it possible to lower voltage required upon repeated charging and discharging.

The present inventors have carried out an extensive investigation with a view toward overcoming the above-described problems involved in the prior art. As a result, it has been found that a transfer material-carrying member exhibiting excellent mechanical physical properties and electrical characteristics can be obtained from a resin composition comprising a polyester resin containing ethylene terephthalate as a predominant repeating unit and having a specific reduced viscosity, and a polyamide resin and/or a polycarbonate resin in specifically selected compositional proportions. The present invention has been led to completion on the basis of this finding.

According to the present invention, there is thus provided a transfer material-carrying member formed from a resin composition comprising at least two resins selected from the group consisting of (A) a polyester resin containing a predominant repeating unit composed of ethylene terephthalate and having a reduced viscosity of at least 0.9 dl/g, (B) a polyamide resin, and (C) a polycarbonate resin, wherein the compositional proportions by mass % of the respective resins are included within a range of a pentagon having points (98, 2, 0), (85, 15, 0), (65, 15, 20), (72, 0, 28) and (90, 0, 10) as vertexes when represented by a triangular coordinate indicated in the above order (A, B, C).

DETAILED DESCRIPTION OF PREFERRED EMBODIMENTS

Figure 1:
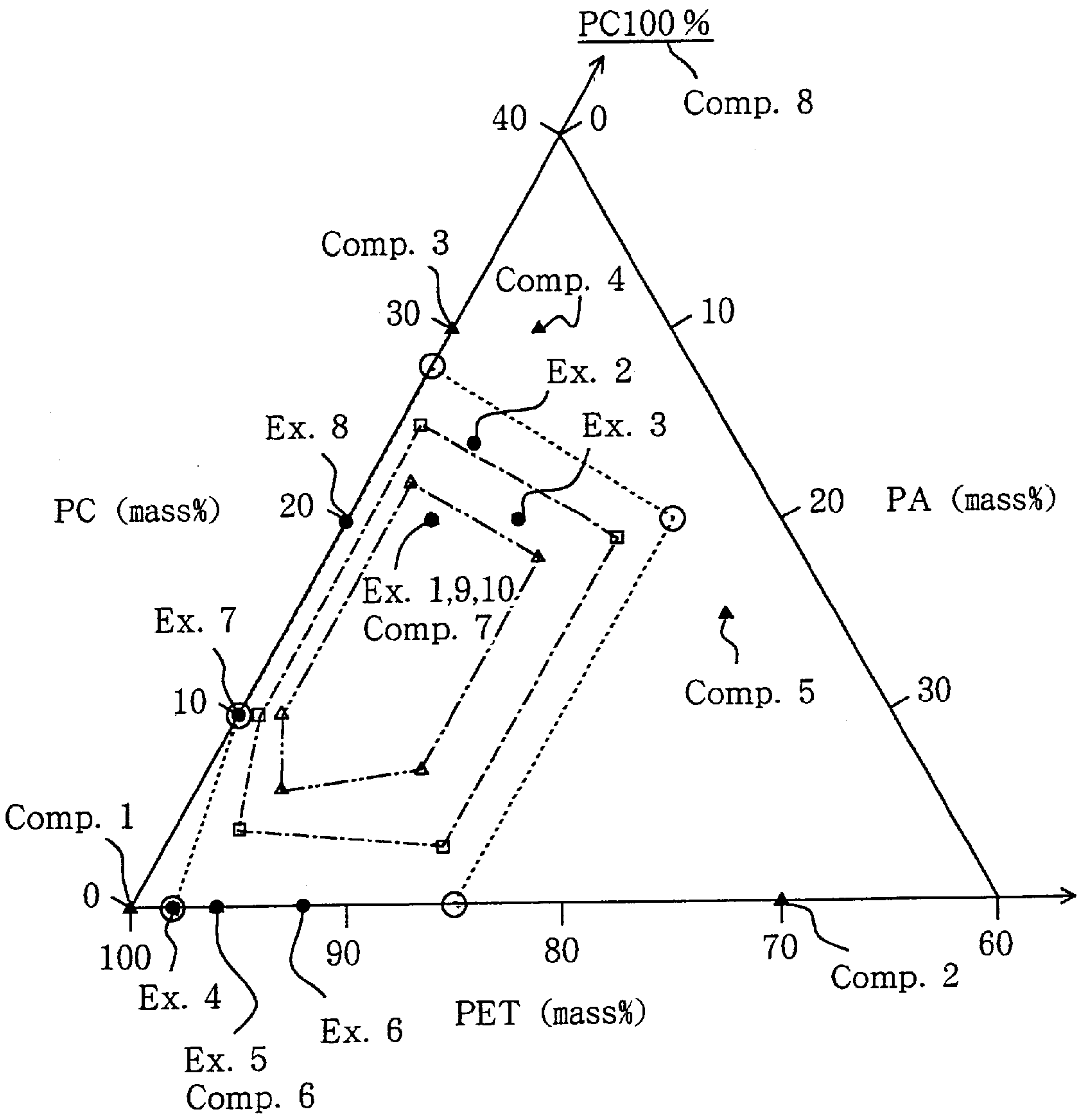
FIG. 1 illustrates a triangular coordinate indicating the compositional proportions by mass % of the respective resins in a resin composition useful in the practice of the present invention.

The polyester resin useful in the practice of the present invention is preferably a polyethylene terephthalate resin containing a predominant repeating unit composed of ethylene terephthalate, in which preferably at least 80 mol %, more preferably at least 90 mol % of the acid component is terephthalic acid, and preferably at least 80 mol %, more preferably at least 90 mol % of the glycol component is ethylene glycol. As other acid components, there are used isophthalic acid, adipic acid, sebacic acid, hexahydrophthalic acid, diphenyl ether-4,4'-dicarboxylic acid, naphthalene-1,4-dicarboxylic acid, naphthalene-2,6-dicarboxylic acid, decane-1,10-dicarboxylic acid, p-β-hydroxyethoxybenzoic acid, 4,4'-dicarboxybenzophenone and cyclohexane-1,4-dicarboxylic acid. As other glycol components, there are used propylene glycol, diethylene glycol, tetraethylene glycol, butanediol and cyclohexanedimethanol. Further, a small amount of compounds having an amide bond, urethane bond, ether bond, carbonate bond or the like may be contained as other copolymerizable components.

As a polymerization process for obtaining such a polyester resin, a known process, for example, a direct esterification process or transesterification process, is used. A reaction catalyst and additives such as a stabilizer may also be optionally used from among known materials.

The polyester resin used in the present invention should have a reduced viscosity of at least 0.9 dl/g, preferably at least 1.0 dl/g, more preferably at least 1.1 dl/g in order to satisfy mechanical characteristics of the resulting resin composition. If the reduced viscosity of the polyester resin is too low, the tensile elongation at break of the resulting resin composition is markedly lowered, resulting in deterioration of endurance. The upper limit of the reduced viscosity is generally about 2.0 dl/g.

The reduced viscosity (unit: dl/g) is determined by measuring a relative viscosity ($\eta_{rel}$) of a solution in a trifluoroacetic acid solvent at a polymer concentration ($C_0$) of 0.5 g/dl and 20° C. by an Ubbellohde viscometer in accordance with ASTM D 4603 and calculating out the reduced viscosity in accordance with the equation (2):

$$\text{Reduced viscosity}=(\eta_{rel}-1)/C_0 \quad (2)$$

The polyamide resin useful in the practice of the present invention includes resins obtained from an aliphatic diamine such as hexamethylenediamine, an alicyclic diamine such as piperazine, an aromatic diamines such as m-xylylenediamine, or a lactam such as ϵ-caprolactam. The polyamide resin may be a homopolymer, a copolymer or a mixture of at least two of these polymers. m-Xylylene group-containing resins [for example, poly(m-xylyleneadipamide), poly(m-xylylenepimelamide), poly(m-xylyleneazelamide), etc.] and resins having an aromatic ring (phthalic group), such as copolymers of isophthalic acid and/or terephthalic acid with hexamethylenediamine, may preferably be used from the viewpoint of processing stability upon forming. The weight average molecular weight of the polyamide resin may be optional so far as it is within an ordinary range. However, it is desirable from the viewpoints of forming and processing ability and physical properties that the weight average molecular weight should be preferably 5,000 to 60,000, more preferably from 20,000 to 45,000.

As the polycarbonate resin useful in the practice of the present invention, aromatic polycarbonate resins may preferably be used, and bisphenol A group-containing resins are particularly preferably used. The weight average molecular weight of the polycarbonate resin may be optional so far as it is within an ordinary range. However, it is desirable from the viewpoints of forming and processing ability and physical properties that the weight average molecular weight should be preferably 15,000 to 40,000, more preferably from 18,000 to 35,000.

An antioxidant, ultraviolet absorbent, processing aid, halogen-containing or halogen-free flame retardant, flame-retarding aid and/or the like may be added to the polyester resin, polycarbonate resin and polyamide resin used in the present invention.

In the present invention, there is used, as a resin material for forming a transfer material-carrying member, a resin composition comprising at least two resins selected from the group consisting of (A) a polyester resin containing a predominant repeating unit composed of ethylene terephthalate and having a reduced viscosity of at least 0.9 dl/g, (B) a polyamide resin, and (C) a polycarbonate resin, wherein the compositional proportions by mass % of the respective resins are included within a range of a pentagon having points (98, 2, 0), (85, 15, 0), (65, 15, 20), (72, 0, 28) and (90, 0, 10) as vertexes when represented by a triangular coordinate indicated in the above order (A, B, C). FIG. 1 illustrates the fact that the compositional proportions by mass % of the polyester resin (PET), polyamide resin (PA) and polycarbonate resin (PC) form a pentagon having the above-described points as vertexes when represented by the triangular coordinate. This is a pentagon surrounded by ○ and dotted lines in FIG. 1.

When the compositional proportions of the respective resins fall within the range of the above pentagon, a resin composition which is well balanced among tensile elongation at break, fatigue endurance, stiffness, specific dielectric constant and the like and suitable for use as a material for a transfer material-carrying member can be obtained. Resin compositions in which the compositional proportions of the respective resins do not fall within the range of the pentagon become insufficient in at least one of the above-described characteristics or properties.

A preferred resin composition is such that the compositional proportions by mass % of the respective resins are included within a range of a pentagon having points (93, 3, 4), (84, 13, 3), (68, 13, 19), (74, 1, 25) and (89, 1, 10) as vertexes when represented by the triangular coordinate indicated in the above order (A, B, C). This is a pentagon surrounded by □ and alternate long and short dash lines in FIG. 1. A more preferred resin composition is such that the compositional proportions by mass % of the respective resins are included within a range of a pentagon having points (90, 4, 6), (83, 10, 7), (72, 10, 18), (76, 2, 22) and (88, 2, 10) as vertexes when represented by the triangular coordinate indicated in the above order (A, B, C). This is a pentagon surrounded by Δ and alternate long and two short dashes lines in FIG. 1.

In the present invention, the above resin composition is formed into, for example, a film, sheet, tube or belt. As a process for preparing the resin composition, there is used a known process such as a process in which the respective raw materials are mixed in advance by means of a single-screw or twin-screw extruder, and the mixture is formed into pellets, or a process in which pellets of the respective raw materials are mixed and formed into a film, sheet, tube or belt. The form and size of the transfer material-carrying member may be optional so far as the member can be installed in an image forming apparatus to which the member will be applied. The transfer material-carrying member is generally formed in the form of a drum (including the form of a roller) or an endless belt (including the form of a tube). The drum type transfer material-carrying member is fabricated by forming a layer of the resin composition on a drum base. The layer of the resin composition is formed by coating the drum base with the resin composition or applying a tube or sheet formed of the resin composition to the drum base. In the present invention, it is preferred that the resin composition is formed in the form of an endless belt to provide it as a transfer material-carrying member. The belt or tube may be formed either by bonding both ends of a sheet formed from the resin composition in advance to each other to form an endless belt or by continuously forming an endless product by means of an extruder having a circular die. The transfer material-carrying member according to the present invention may contain a processing stabilizer, antioxidant, ultraviolet absorbent, flame retardant, colorant and/or the like upon its forming within limit not impeding the objects of the present invention.

ADVANTAGES OF THE INVENTION

According to the present invention, there are provided transfer material-carrying members which have excellent mechanical fatigue endurance, tensile elongation at break, mechanical endurance, stiffness and the like and a high specific dielectric constant and make it possible to lower voltage required upon repeated charging and discharging.

EMBODIMENTS OF THE INVENTION

The present invention will hereinafter be described more specifically by the following Examples and Comparative Examples. Various physical properties in the examples were evaluated in accordance with the following respective methods.

(1) Reduced Viscosity of Polyester Resin

The reduced viscosity is determined in accordance with ASTM D 4603. More specifically, a relative viscosity ($\eta_{rel}$) of a solution in a trifluoroacetic acid solvent at a polymer concentration ($C_0$) of 0.5 g/dl was measuring at 20° C. by an Ubbellohde viscometer. The reduced viscosity was calculated out in accordance with the equation (2):

$$\text{Reduced viscosity}=(\eta_{rel}-1)/C_0 \qquad (2)$$

(2) Tensile Elongation at Break

The tensile elongation at break was determined in accordance with ASTM D 882. TENSILON RTM-100 (trade name) manufactured by Orientec K.K. was used as a measuring apparatus. An average value in the number of determinations, n=5 was found. The measurement was conducted in the environment of 23° C. and 50% RH (relative humidity).

(3) Mechanical Endurance (Number of Times of Passage on Roll)

A load of 29.4 N was applied to both lengthwise ends of a strip specimen 10 mm in width and 110 mm in length cut out of each sample, and the specimen was subjected to reciprocating movement on a freely rotating roll having a diameter of 20 mm to determine the number of times of passage on the roll until the specimen was broken. The number of times of passage on the roll corresponds to 2 times as many as the number of times of reciprocating movement. The amplitude and reciprocating speed of the specimen were preset to 25 mm and 140 times/min, respectively. The reciprocating speed corresponds to 7 m/min in terms of an average speed. This evaluation method corresponds to an accelerated test by a fatigue failure testing machine commonly used in this field. An average value in n=3 was found. The measurement was conducted in the environment of 23° C. and 50% RH.

(4) Clark Stiffness

The Clark stiffness was measured by using, as a measuring apparatus, 2047 (trade name) manufactured by Kumagai Kogyo K.K. in accordance with JIS P 8143. An average value in n=3 was found. The measurement was conducted in the environment of 23° C. and 50% RH.

(5) Specific Dielectric Constant

The specific dielectric constant was measured in accordance with ASTM D 150. An LCR meter HP4274A (trade name) manufactured by Hewlett Packard Co. was used as a measuring apparatus to calculate out the specific dielectric constant from an electrostatic capacity in 1 kHz. An average value in n=3 was found. The measurement was conducted in the environment of 23° C. and 50% RH.

EXAMPLES 1 TO 10, AND COMPARATIVE EXAMPLES 1 TO 8

As row materials, were used the following polyester resins a to g, polyamide resin f to h and polycarbonate resins i to k. These raw materials were used in their corresponding combinations and compositional proportions shown in Table 1 to form respective sheets having a thickness of 130 μm by means of a single-screw extruder equipped with a T-die. The physical property values of the resultant sheets are shown in Table 2.

<Polyester resins>

(a) "Kurapet KS71OB-4", trade name, product of Kuraray Co., Ltd., reduced viscosity: 1.13 dl/g;

(b) "Bell Pet FFG5H", trade name, product of Kanegafuchi Chemical Industry Co., Ltd., reduced viscosity: 1.40 dl/g;

(c) "Sealer PT7067", trade name, product of Mitsui Du Pont Polychemicals Co., Ltd., reduced viscosity: 1.17 dl/g;

(d) "Sealer PT8111", trade name, product of Mitsui Du Pont Polychemicals Co., Ltd., reduced viscosity: 0.85 dl/g;

(e) "Bell Pet FFG6C", trade name, product of Kanegafuchi Chemical Industry Co., Ltd., reduced viscosity: 0.82 dl/g.

<Polyamide resins>

(f) "MX Nylon 6121", trade name, product of Mitsubishi Gas Chemical Company, Inc.;

(g) "Novamide X21", trade name, product of Mitsubishi Kagaku Co., Ltd.;

(h) "Amilan 1021", trade name, product of Toray Industries, Inc.,;

<Polycarbonate resins>

(i) "Toughlon IRE2200", trade name, product of Idemitsu Petrochemical Co., Ltd.;

(j) "Panlight LN1250", trade name, product of Teijin Limited;

(k) "Novalex 7030A", trade name, product of Mitsubishi Kagaku Co., Ltd.

TABLE 1

| | PET | | | PA | | PC | |
|---|---|---|---|---|---|---|---|
| | Kind | Reduced viscosity (dl/g) | Compositional ratio (mass %) | Kind | Compositional ratio (mass %) | Kind | Compositional ratio (mass %) |
| Ex. 1 | a | 1.13 | 76 | f | 4 | i | 20 |
| Ex. 2 | a | 1.13 | 72 | f | 4 | i | 24 |
| Ex. 3 | a | 1.13 | 72 | f | 8 | i | 20 |
| Ex. 4 | a | 1.13 | 98 | f | 2 | — | — |
| Ex. 5 | a | 1.13 | 96 | f | 4 | — | — |
| Ex. 6 | a | 1.13 | 92 | f | 8 | — | — |
| Ex. 7 | a | 1.13 | 90 | — | — | i | 10 |
| Ex. 8 | a | 1.13 | 80 | — | — | i | 20 |
| Ex. 9 | b | 1.40 | 76 | g | 4 | i | 20 |
| Ex. 10 | c | 1.17 | 76 | h | 4 | j | 20 |
| Comp. Ex. 1 | a | 1.13 | 100 | — | — | — | — |

TABLE 1-continued

| | PET | | | PA | | PC | |
|---|---|---|---|---|---|---|---|
| | Kind | Reduced viscosity (dl/g) | Compositional ratio (mass %) | Kind | Compositional ratio (mass %) | Kind | Compositional ratio (mass %) |
| Comp. Ex. 2 | a | 1.13 | 70 | f | 30 | — | — |
| Comp. Ex. 3 | a | 1.13 | 70 | — | — | i | 30 |
| Comp. Ex. 4 | a | 1.13 | 66 | f | 4 | i | 30 |
| Comp. Ex. 5 | a | 1.13 | 65 | f | 20 | i | 15 |
| Comp. Ex. 6 | d | 0.85 | 96 | f | 4 | — | — |
| Comp. Ex. 7 | e | 0.82 | 76 | f | 4 | i | 20 |
| Comp. Ex. 8 | — | — | — | — | — | k | 100 |

TABLE 2

| | Tensile elongation at break in MD (%) | Number of times of passage on roll in MD (x $10^3$ times) | Clark stiffness in MD ($cm^3$) | Specific dielectric constant |
|---|---|---|---|---|
| Ex. 1 | 530 | 800 | 68 | 3.8 |
| Ex. 2 | 390 | 600 | 71 | 3.9 |
| Ex. 3 | 350 | 450 | 69 | 4.0 |
| Ex. 4 | 660 | 750 | 70 | 3.8 |
| Ex. 5 | 600 | 400 | 65 | 4.0 |
| Ex. 6 | 500 | 300 | 64 | 4.0 |
| Ex. 7 | 630 | 800 | 63 | 3.8 |
| Ex. 8 | 550 | 650 | 64 | 3.7 |
| Ex. 9 | 500 | 600 | 68 | 3.7 |
| Ex. 10 | 450 | 800 | 68 | 3.7 |
| Comp. Ex. 1 | 560 | 800 | 58 | 3.5 |
| Comp. Ex. 2 | 200 | 200 | 55 | 3.9 |
| Comp. Ex. 3 | 400 | 100 | 70 | 3.5 |
| Comp. Ex. 4 | 310 | 80 | 64 | 3.8 |
| Comp. Ex. 5 | 60 | 250 | 66 | 3.8 |
| Comp. Ex. 6 | 120 | 50 | 66 | 3.7 |
| Comp. Ex. 7 | 100 | 40 | 65 | 3.7 |
| Comp. Ex. 8 | 100 | 400 | 70 | 2.9 |

The compositional proportions of the resin compositions in Examples 1 to 10, and Comparative Examples 1 to 8 were respectively plotted in FIG. 1. In FIG. 1, Ex. 1, Ex. 2 . . . Ex. 10 indicate the respective resin compositions according to Examples 1 to 10, while Comp. 1, Comp. 2 . . . Comp. 8 indicate the respective resin compositions according to Comparative Examples 1 to 8.

As apparent from Tables 1 and 2, the sheet samples (Examples 1 to 10) respectively formed from the resin compositions according to the present invention have excellent mechanical fatigue endurance (the number of times of passage on the roll) and are improved in mechanical reliability, since they cause ductile fracture due to their high mechanical elongation (tensile elongation at break). In addition, the sheet samples formed from the resin composition according to the present invention make it possible to lower voltage required upon repeated charging and discharging, since the specific dielectric constants thereof are higher compared with that of the general polyester resin (Comparative Example 1). For example, when the sample in Example 1 is compared with the sample in Comparative Example 1, the specific dielectric constant of the sample in Example 1 is 1.1 times as much as that of the sample in Comparative Example 1. Therefore, the voltage required to obtain a fixed charge level in the sample of Example 1 may be lower by 10 percent than that of Comparative Example 1 judging from the relationship of V=Q/C. Accordingly, the transfer material-carrying members formed from the resin compositions according to the present invention also have the advantage of being able to make an electric power unit smaller.

What is claimed is:

1. A member for transferring an image formed from a resin composition comprising: (A) a polyester resin containing a predominant repeating unit composed of ethylene terephthalate and having at reduced viscosity of a least 0.9 dl/g, (B) a polyamide resin, and (C) a polycarbonate resin, wherein the compositional proportions by mass % of the respective resins are enclosed with a pentagon having points (98, 2, 0), (85, 15, 0), (65, 15, 20), (72, 0, 28) and (90, 0, 10) as vertexes when represented by a triangular coordinate indicated in the above order (A, B, C).

2. The member for transferring an image according to claim 1, wherein the compositional proportions by mass % of the respective resins in the resin composition are enclosed with a pentagon having points (93, 3, 4), (84, 13, 3), (68, 13, 19), (74, 1, 25) and (89, 1, 10) as vertexes when represented by the triangular coordinate indicated in the above order (A, B, C).

3. The member for transferring an image according to claim 1, wherein the compositional proportions by mass % of the respective resins in the resin composition are enclosed with a pentagon having points (90, 4, 6), (83, 10, 7), (72, 10, 18), (76, 2, 22) and (88, 2, 10) as vertexes when represented by the triangular coordinate indicated in the above order (A, B, C).

4. The member for transferring an image according to claim 1, wherein (A) the polyester resin is a polyethylene terephthalate resin, in which at least 80 mol % of the acid component is terephthalic acid, and at least 80 mol % of the glycol component is ethylene glycol.

5. The member for transferring an image according to claim 1, wherein (B) the polyamide resin contains a m-xylylene group.

6. The member for transferring an image according to claim 5, wherein the m-xylylene group-containing polyamide resin is poly(m-xylyleneadipamide), poly(m-xylylenepimelamide) or poly( m-xylyleneazelamide).

7. The member for transferring an image according to claim 1, wherein (B) the polyamide resin contains a phthalic group.

8. The member for transferring an image according to claim 7, wherein the phthalic group-containing polyamide resin is a copolymer of hexamethylenediamine and at least one acid selected from the group consisting of isophthalic acid and terephthalic acid.

9. The member for transferring an image according to claim 1, wherein (C) the polycarbonate resin is an aromatic polycarbonate resin.

10. The member for transferring an image according to claim 9, wherein the aromatic polycarbonate resin is a bisphenol A group-containing resin.

11. The member for transferring an image according to claim 1, which is in the form of a tube.

* * * * *